United States Patent [19]

James et al.

[11] 3,910,530

[45] Oct. 7, 1975

[54] LEADING EDGE FLAP

[75] Inventors: Varnell L. James, Enumclaw; Eugene G. Hill, Seattle, both of Wash.

[73] Assignee: The Boeing Company, Seattle, Wash.

[22] Filed: Nov. 7, 1973

[21] Appl. No.: 413,606

[52] U.S. Cl. .......................... 244/42 D; 244/42 CA
[51] Int. Cl.² .......................................... B64C 3/50
[58] Field of Search ........... 244/42 R, 42 C, 42 CA, 244/42 CB, 42 D, 42 DA; 416/23, 87

[56] References Cited
UNITED STATES PATENTS

| | | | |
|---|---|---|---|
| 3,504,870 | 4/1970 | Cole et al. | 244/42 R |
| 3,524,610 | 8/1970 | Alvarez-Calderon | 244/42 R |
| 3,556,439 | 1/1971 | Autry et al. | 244/42 D |
| 3,743,219 | 7/1973 | Gorges | 244/42 CA |
| 3,743,220 | 7/1973 | Stinson | 244/42 CA |

Primary Examiner—Trygve M. Blix
Assistant Examiner—Barry L. Kelmachter
Attorney, Agent, or Firm—Christensen, O'Connor, Garrison & Havelka

[57] ABSTRACT

An aircraft wing incorporates a leading edge flap which is retractable into an opening provided in the bottom surface of the wing. The flap is actuated by compact linkage which allows room for auxiliary equipment in the leading edge portion of the wing forward of the forwardmost main spar. The flap includes a surface panel having a rigid rear section which when retracted into the wing forms a part of the bottom airfoil surface of the wing and a flexible central section which when extended is curved to form a portion of the flap airfoil surface and when retracted is partially straightened out to conform to the contour of the bottom airfoil surface of the wing. A bullnose is pivotally mounted on rigid structure forming a part of the flap. When the flap is extended, the bullnose forms a downward and rearward extension of the flap airfoil surface. Upon retraction of the flap, the bullnose is folded inwardly to a tucked position above the flap and inside the wing. A link, interconnecting the bullnose and the central section of the flap surface panel, causes the central section to flex between its extended position and its retracted position responsive to movement of the bullnose.

8 Claims, 2 Drawing Figures

LEADING EDGE FLAP

BACKGROUND OF THE INVENTION

This invention relates to airfoils, and more particularly to a novel leading edge flap apparatus and mechanism for actuating the apparatus.

A leading edge flap which retracts into an opening in the bottom of a wing is disclosed in U.S. Pat. No. 3,504,872 to Cole et al. The Cole et al flap has an aerodynamic surface panel which is flexible so that it can conform to the lower airfoil surface of the wing in a retracted position and, when in an extended position, can assume a predetermined curved configuration to fulfill its function as a leading edge flap. The flap structure and actuating apparatus shown in Cole et al are adequate for the disclosed wing cross-section and its intended use. However, the Cole et al mechanism is relatively heavy and somewhat bulky for some applications. Moreover, the mechanism for actuating the Cole et al. leading edge flap does not lend itself to a compact retracted (or stowed) configuration.

It is desirable to employ a flap structure in which minimum flexure of the flap panel occurs. Also in certain aircraft, especially of the STOL variety, it has been found necessary to employ leading edge boundary layer control equipment as well as to conserve space for fuel tanks and other mechanism in the wing structure. An apparatus having the bulk, weight and complexity of the Cole et al structure does not lend itself to incorporation in such aircraft.

An object of the present invention is to provide a leading edge flap apparatus and actuating mechanism which can be compactly retracted into the forward position of a wing adjacent the leading edge thereof and to provide a flexible surface panel for the flap which conforms to the lower airfoil surface of the wing in a retracted position, while assuming a desired flap curvature in the extended position. A further object of the invention is to provide a flexible surface panel having a rigid section and a flexible section to minimize the amount of fatigue causing flexure in the panel and to reduce the amount of flexible panel surface in order to minimize the tendency of the panel to change in curvature under varying aerodynamic loads. Other objects are to provide a leading edge flap with a folding bullnose which is associated through appropriate linkage with the flexible section of the surface panel to vary the curvature thereof, to provide compact actuating mechanism for such a flap, and to provide a flap which can accomplish the foregoing objects without sacrificing weight, simplicity or structural rigidity.

SUMMARY OF THE INVENTION

In accordance with the foregoing objects, and other objects that will become apparent to one of ordinary skill in the art upon reading the following description, the present invention provides an improved leading edge flap apparatus for an aircraft wing. The leading edge flap apparatus forms a rigid leading edge flap airfoil surface having a desired curvature when extended and forms a portion of the bottom surface of the wing when retracted into an opening in the bottom of the wing. The flap airfoil surface, having a trailing portion, a central portion and a leading portion, is formed by a flap means including a rigid structural member, a rigid panel, a flexible panel and a bullnose. The rigid structural member is pivotally connected to the wing and has a panel supporting edge with a curvature corresponding to the desired curvature of a portion of the flap airfoil surface. The rigid surface panel is rigidly affixed to the rigid structural member and forms the trailing portion of the flap airfoil surface when the flap apparatus is extended. The flexible panel adjoins the rear panel and overlies a portion of the panel supporting edge on the rigid structural member and forms the central portion of the flap airfoil surface when the flap apparatus is extended. A bullnose is pivotally mounted on the rigid structural member and forms the leading portion of the flap airfoil surface when the flap apparatus is extended. An actuating means is coupled between the wing and the flap means for moving the flap means between an extended position wherein it is oriented downwardly and forwardly from the wing and a retracted position wherein it is positioned in the opening in the bottom of the wing. A linkage means is mounted on the flap means and is operative in response to movement of the actuating means for flexing the central panel between a first position and a second position. The central panel is flexed to the first position when the flap means is moved to the extended position. In the first position the central panel is oriented to rest on the flap supporting edge of the rigid structural member, which causes the flexible central panel to conform to the shape of the desired curvature of the flap airfoil surface. The flexible panel is flexed to the second position as the flap means is moved to the retracted position. In the second position, the central panel is spaced from the panel supporting edge of the rigid structural member so that it conforms to the curvature of the bottom surface of the wing. The linkage means is also operative in response to movement of the actuating means to pivot the bullnose between a first position and a second position. The bullnose is pivoted in the first position when the flap means is pivoted to the extended position. In the first position the bullnose extends downwardly from the flexible panels to form the leading portion of the flap airfoil surface. The bullnose is pivoted to its second position when the flap means is pivoted to the retracted position. In the second position the bullnose is positioned within the opening in the wing and is folded above the flexible panel and the rigid member.

DESCRIPTION OF THE DRAWINGS

A better understanding of the present invention can be acquired by reading the ensuing specification in conjunction with the accompanying drawings wherein.

DESCRIPTION OF THE PREFERRED EMBODIMENT

Figure 1:
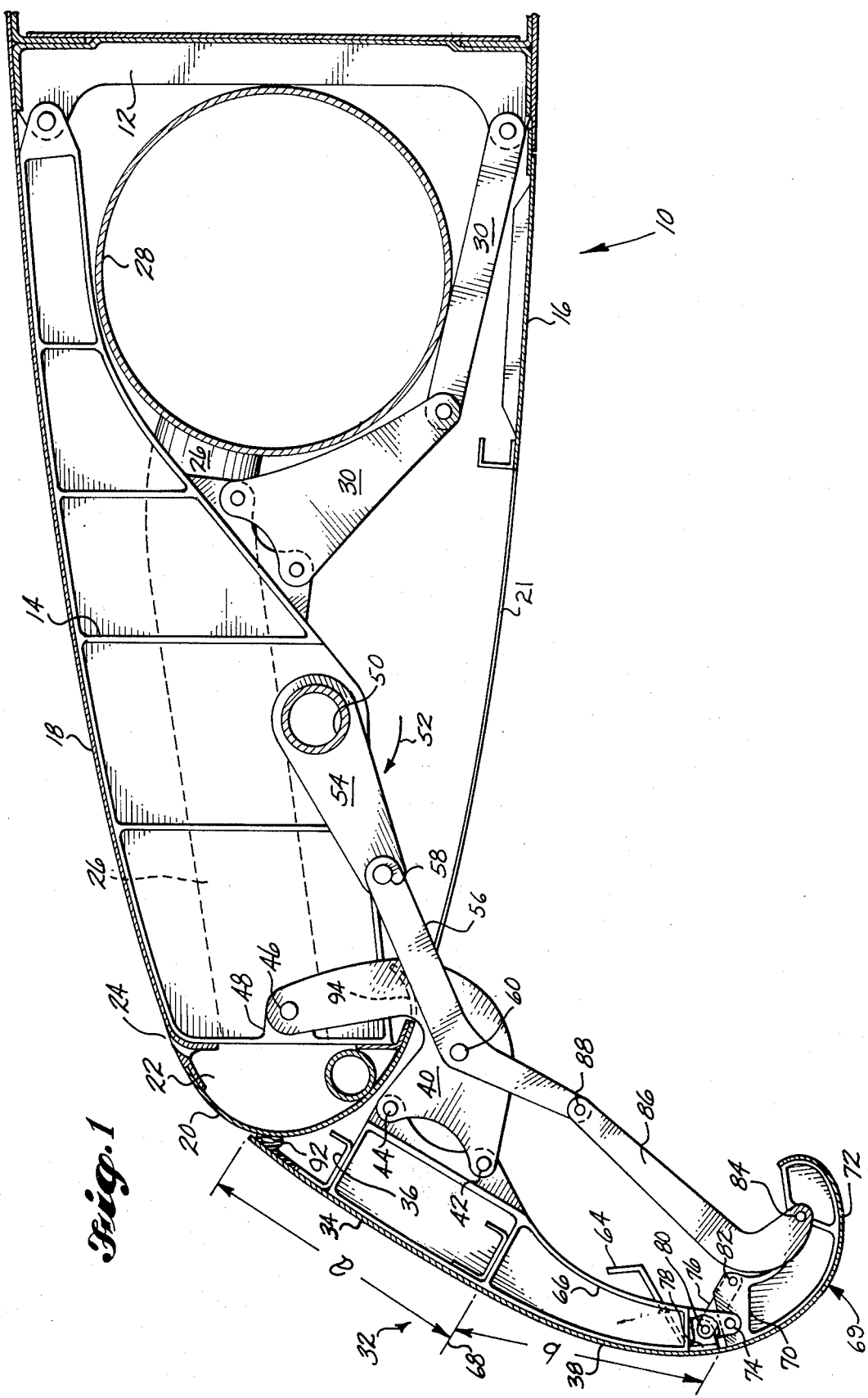
FIG. 1 is a cross-sectional view of the leading portion of an aircraft wing showing the leading edge flap apparatus of the present invention in an extended position.

As shown in FIG. 1, a leading section of an aircraft wing 10 includes a forwardmost wing spar 12, a forwardly extending rib 14, a lower surface panel 16, an upper surface panel 18, a leading edge panel 20, and reinforcing structural members 30. The wing design incorporates a conventional airfoil cross-section or other airfoil design as desired. It is to be understood that the wing 10 is constructed in a conventional manner with the forwardmost main spar 12 extending spanwise along the wing. Several ribs (not shown and hereafter referred to in the singular sense) similar to rib 14 are affixed to and extend forwardly from the spar at spaced locations along the spanwise dimension of the spar 12. The upper surface panel 18 also extends spanwise along the wing 10 and is rigidly affixed by conventional means (not shown) to the spar 12 and to the forwardly extending ribs. The leading edge panel 20 is a downwardly and rearwardly curving, forward extension of the upper surface panel 18. The leading edge panel 20 is affixed at its lower terminus to the bottom forward portion of the rib 14. The bottom surface panel 16 is affixed (by means not shown) to the bottom portion of the spar 12 and the rearward portion of the forwardly extending rib 14. An opening 21 is formed in the bottom surface panel between the lowermost portion of the leading edge panel 20 and a location rearwardly thereof between the leading edge of the wing 10 and the spar 12. This opening 21 receives the leading edge flap apparatus of the present invention, generally designated 32, when the flap apparatus is in its retracted position.

A plenum 22, located behind the leading edge surface panel 20, supplies air to a slot 24 in the upper portion of the leading edge panel 20, which slot opens onto the upper airfoil surface of the upper panel 18 for the purpose of supplying boundary layer control air thereto. The boundary layer control plenum is supplied with air or other fluid through a conduit 26 communicating between the plenum and a supply duct 28 located below the rib 14 and forwardly of the spar 12. The rib 14 is so constructed at its rearward end to have a narrow cross section. Reinforcing members 30 connected between the central portion of the ribs 14 and the lower bottom portion of the spar 12 rigidify the leading edge structure of the wing 10. The reinforcing members 30 include a first forward member rigidly connected at one end to the central portion of the rib 14 and connected at its other end to a second reinforcing member. The rearward portion of the second reinforcing member is connected to the lower, forward portion of the spar 12.

The leading edge flap apparatus 32 includes a flap spar member 36 which runs spanwise along the flap apparatus 32, a forwardly extending rib 66, a flap surface panel having a rigid trailing portion 34 and a central flexible portion 38, and a folding bullnose section 69. It is to be understood that the flap apparatus 32, including the flap surface panel and the bullnose, has a spanwise dimension sufficient to fulfill its lift supplementing function. The flap spar 36 runs substantially the entire length of the flap structure. A plurality of ribs (not shown and hereafter referred to in the singular sense) similar to rib 66 extend forwardly from the flap spar 36 at spaced locations along the spanwise dimension of the flap apparatus. In this embodiment the ribs are formed integrally with the flap spar 36. The forward edges of the spar 36 and the rib 66 first curves downwardly and forwardly and thereafter downwardly and slightly rearwardly to conform to the desired airfoil shape of the flap apparatus when extended. The trailing portion 34 of the surface panel 34 is substantially rigid over its width, denoted "a" in FIG. 1, and is rigidly affixed to the flap spar 36 and the rib 66. The central portion 38 of the flap 32 is integral with the trailing portion 34 and extends forwardly and downwardly from the trailing portion 34. The central portion 38 is not affixed to the rib 36, but can flex toward and away from the forward edge of rib 66 over its entire length, denoted "b" in FIG. 1. In the extended position the central portion 38 of the panel rests on the forward edge of rib 66, thereby causing it to conform to the desired flap curvature. The lowermost portion of the central portion 38 of the flap panel is affixed to a rigid spar-like member 64 which extends spanwise along the rearward surface of the central panel portion 38. When the central panel portion is flexed the spar-like member 64 and the lower part of the central panel portion 38 move together relative to rib 66 as will be explained further below.

The bullnose 69 includes a plurality of ribs (not shown and hereafter referred to in the singular) similar to rib 70 positioned at spaced locations along the spanwise dimension of the bullnose. A bullnose surface panel 72 is fixed to the ribs 70. In an extended position, as shown in FIG. 1, the bullnose surface panel 72 extends downwardly and rearwardly from the bottom edge of the central panel portion 38 to form the forward bottom curved portion of the flap airfoil surface. The bullnose 70 is pivotally connected to the flap rib 66 by pin 74. An actuating link, pivotally connected at one end by pin 82 to bullnose rib 70 rearwardly of pin 74, is also pivotally connected by pin 80 to a flange 78 which extends rearwardly from spar-like member 64. As the bullnose pivots rearwardly and upwardly about the pivotal axis of pin 74, the link 76 will move toward the rib 66 causing the central panel portion to flex away from the rib 66.

The flap apparatus 32 is supported on the wing by a gooseneck link 40 and is actuated by linkage including power hinge or torque tube 50, arm 54, bell crank 56, and link 86. The gooseneck link or arm 40 is rigidly connected by two pins 42 and 44 to a flange integral with and extending rearwardly from the flap spar 36. The other end of the gooseneck link 40 is pivotally connected by a pin 46 to a flange 48 which extends rearwardly from the central portion of the forward end of the wing rib 14. Thus, one end of the gooseneck link is positioned inside the wing, while the remainder of the link extends through the opening 21 in the bottom surface of the wing 10. The gooseneck link 40 supports the entire flap apparatus 32 for fore and aft pivotal movement, to extend and retract the flap about the pivotal axis of the pin 46. The torque tube 50 and an arm 54 connected in radial orientation to tube 50, commonly referred to as a power hinge, is located for pivotal movement on rib 14 in the wing structure 10. The pivotal axis of the torque tube is parallel with the pivotal axis of gooseneck mounting pin 46. The power hinge is actuated by conventional mechanism (not shown). When the flap apparatus 32 is extended, the arm 54 extends forwardly toward the gooseneck link 40. The bell crank 56 connected at one end by pivot pins 58 to the arm 54 and connected between its two ends by a pin 60 to the gooseneck link 40 pivotally actuates the flap apparatus 32 through its extension and retraction cycles. The other end of the bell crank 56 is pivotally connected by pin 88 to one end of the L-shaped link 86. The other end of link 86 is pivotally connected by pin 84 to the rearward portion of bullnose rib 70.

When the torque tube is rotated in the direction opposite to that indicated by arrow 52 the flap apparatus 32 is extended. As torque tube 50 is rotated in the direction of arrow 52, the arm 54 pulls on bell crank 56 in turn causing the gooseneck link 40 to pivot about its pivot pin 46 into the leading portion of the wing 10. At the same time the bell crank 56 is rotated by the arm 54 in a counterclockwise direction as the gooseneck link 40 is pulled into the wing 10 through the opening 21. The coaction of the bell crank 56 and the movement of the gooseneck link 40 causes the end of the link 86 connected to the bell crank to be pulled upwardly and toward the rib 66. Thus, the bullnose 69 is pivoted upwardly about its pivotal mounting by pin 74 to a location behind the rib 66. At the same time the link 76, interconnecting the bullnose rib 70 and the flange 78 on the spar-like member 64, pushes forwardly on the flexible central panel portion 38, moving it away from the spar rib 66.

Figure 2:
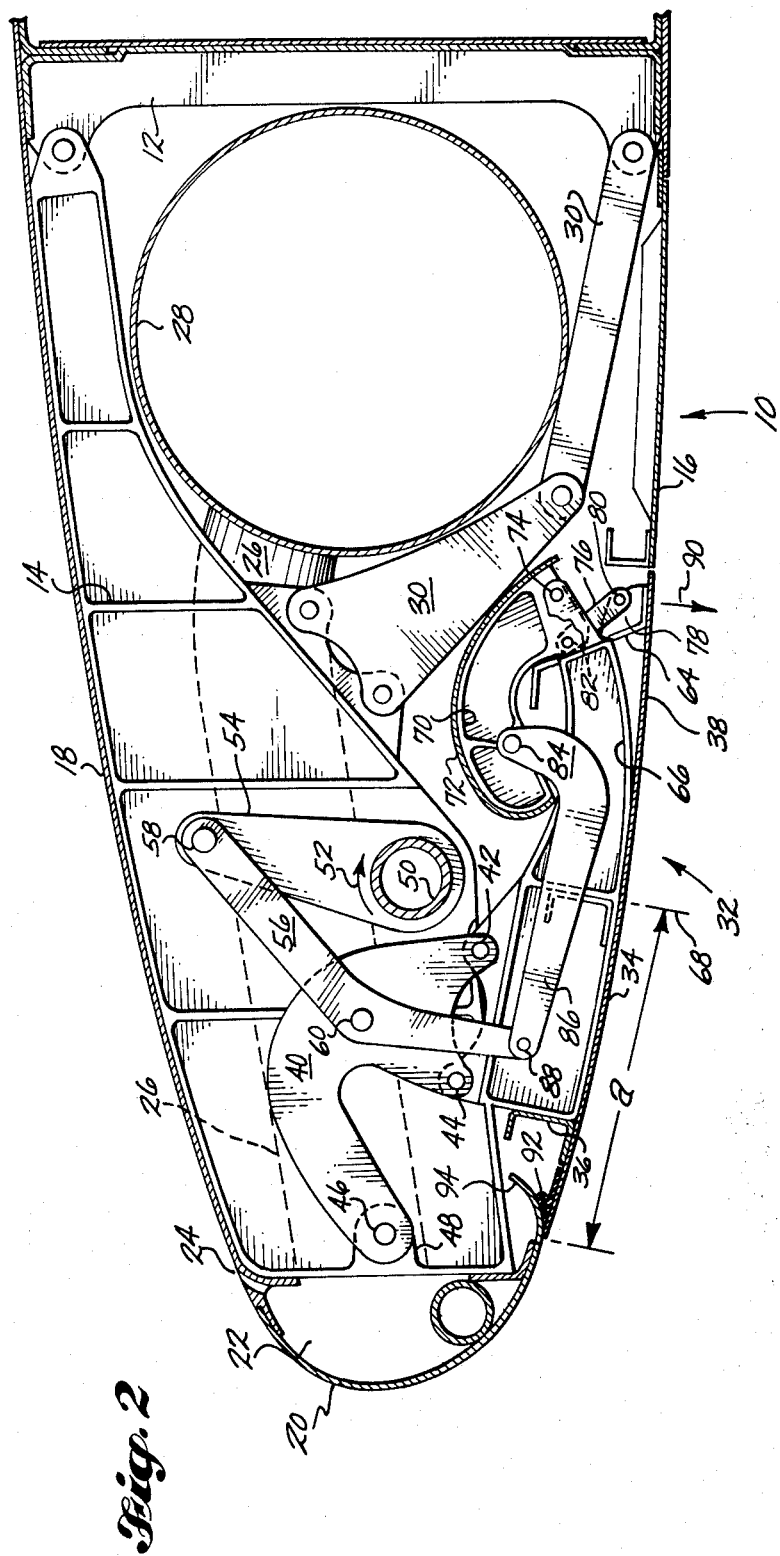
FIG. 2 is a cross-sectional view of the leading edge flap apparatus of the present invention in a retracted position.

As shown in FIG. 2, the torque tube 50 has been rotated in the direction of arrow 52 to move the arm 54 upwardly to a retracted position. This movement draws the bell crank 56 into a retracted position within the leading edge section 10 of the wing. Likewise, arm 40 is drawn into the interior of the leading section of the wing 10. The rigid portion 34 of the leading edge flap 32, denoted by length "a," is retracted to a position to form a part of the continuous lower airfoil surface of the wing 10 beginning rearwardly of the leading edge 20. As the crank 56 pivots about pin 60, arm 86 is moved thereby folding the bullnose about its pivotal connection pin 74 to a location above and inwardly of the leading edge flap apparatus 32. As this occurs, the distance between the pivot pin 80 and the pivot pin 74 is increased. Thus, the flexible portion 38 of the flap surface panel is forced downwardly away from rib 66 in the direction of arrow 90 by the movement of link 76. As the flexible portion 38 flexes outwardly in the direction of arrow 90, its outer surface matches the location of the lower airfoil surface panel 16. In this position rigid portion 34 and the flexible portion 38 of the panel cooperate to extend the panel 16 of the lower airfoil surface forwardly to the leading edge 20 in a smooth curve which conforms to the overall configuration of the lower airfoil surface of wing 10.

The present invention has been disclosed in conjunction with a wing embodiment wherein a boundary layer control duct, conduits and plenums are incorporated in the leading edge section of the wing. Referring back to FIG. 1, a seal member 92 is provided adjacent the trailing edge of the rigid section 34 to seal the trailing edge of the flap 32 against the leading edge 20 of the wing section. Seal 92 also functions to seal the trailing edge of the leading edge flap against a mating surface 94 on the interior of the wing section 10 when the leading edge flap 32 is retracted. One of ordinary skill will recognize that by increasing the length of arm 40 and by readjusting the length of the remaining linkage, the leading edge flap apparatus 32 can be made to extend forwardly of the leading edge of the wing, leaving a slot between the flap and the wing. Thus, if auxiliary boundary layer control is not desirable in a particular aircraft, a slotted flap configuration can be employed with the present invention.

In addition to the foregoing, the linkages and interconnection points of the flap apparatus can be appropriately adjusted to provide two or more different positions of extension for the flap apparatus. In different positions of extension the camber of the flap surface panels can be changed as well as the camber relationship between the flap and the wing itself. Thus, for a given design a first extended position can be provided which offers the most favorable airfoil characteristics for takeoff, while a second extended position can be provided which offers the most favorable airfoil characteristics for landing.

The present invention combines the desirable features of a rigid leading edge flap, which maintains its position without flutter or without substantial metal fatigue during numerous extensions and retractions, with the features of a flexible skin leading edge flap. The flexible portion of the leading edge flap allows the aircraft designer to completely retract and nest the leading edge flap in the forward section of the wing, and further allows the designer to readjust the camber of the leading edge flap itself so that it will conform to the lower airfoil surface of the wing when in a retracted position, while providing a desirable airfoil shape when in an extended position. By using a partially rigid flap construction, the linkages required can be simplified, especially that part of the linkage which actuates the flexible skin.

The present invention has been described in relation to a preferred embodiment. One of ordinary skill in the art, after reading the foregoing specification, will be able to effect various alterations, substitutions or equivalents and other changes without departing from the original concept of the invention. It is therefore intended that the invention be limited only by the definition contained in the appended claims.

What is claimed is:

1. Leading edge flap apparatus retractable into an opening in the lower airfoil surface of an aircraft wing, said opening being located rearwardly of the leading edge portion thereof, comprising:

flap means defining an airfoil section and having a rigid trailing surface panel, a rigid structural member rigidly affixed to said trailing surface panel, a flexible central surface panel integrally connected to said trailing surface panel, a rib rigidly connected to said rigid structural member, said rib being spaced from and extending downwardly and forwardly below said central surface panel when said flap means is in an extended position, and a bullnose, said bullnose being pivotally connected at a first point thereon to said rib, a first arm having one end thereof rigidly connected to said rigid structural member, the other end thereof being pivotally connected to said wing adjacent to and rearwardly of said leading edge, a crank means pivotally connected at a first point between the ends thereof to said first arm, a flange connected to said flexible central surface panel at a location adjacent said bullnose, first link means pivotally connected to said crank means at a second point thereon, said second point on said crank means being spaced from said first point on said crank means, and pivotally connected to said bullnose at a point thereon spaced from said first point on said bullnose, second link means pivotally connected to said bullnose at a point thereon spaced from said first point on said bullnose and pivotally connected to said flange, actuating means mounted in said wing rearwardly of said leading edge and movable between at least a first and a second position, said actuating means operatively connected to said crank means, said actuating means in said first position causing said flap means to retract into said opening and in said second position causing said flap means to extend downwardly and forwardly from said opening and causing movement of said crank means and said first link means such that said bullnose is pivoted to a position downwardly of and adjacent to said central panel to form a smooth leading edge flap surface, said actuating means in said first position cooperating with said crank means and said first and second link means to fold said bullnose to a position above said central panel and to flex said central panel to conform to the curvature of the bottom airfoil surface of said wing, said actuating means in said second position cooperating with said crank means and said first and second link means to flex said central panel to form a smooth curved upper surface for said flap means in conjunction with said trailing panel and to pivot said bullnose to operably mate with the forward edge of said central panel to form a downward and rearward continuation of said curved upper surface.

2. The apparatus of claim 1 wherein said actuating means comprises:
   a torque tube means rotatably mounted in said wing having an arm extending therefrom, said crank means pivotally connected at a third point to said arm.

3. The apparatus of claim 2 wherein the rotational axis of said torque tube is oriented in spanwise relationship to said wing.

4. The apparatus of claim 3 wherein all of the pivotal connections have pivotal axes substantially parallel with the rotational axis of said torque tube.

5. The apparatus of claim 4 further comprising:
   seal means connected to said trailing panel and positioned thereon to contact said leading edge portion of said wing when said flap means is in an extended position.

6. In a leading edge flap apparatus for an aircraft wing, said wing having a leading edge and an opening in the bottom surface thereof rearwardly of said leading edge, said flap apparatus forming a leading edge flap airfoil surface having a desired curvature when extended, said apparatus being retractable into said opening and forming a portion of the bottom surface of said wing when retracted, the improvement in said apparatus comprising:
   a. flap means for forming said flap airfoil surface, said flap airfoil surface having a trailing portion, a central portion and a leading portion, said flap means including:
      1. a rigid structural member and means for pivotally connecting said rigid structural member to said wing, said rigid structural member having a panel supporting edge, said panel supporting edge having a curvature corresponding to the desired curvature of said flap airfoil surface,
      2. a rigid surface panel rigidly affixed to said rigid structural member, said rigid panel for forming the trailing portion of said flap airfoil surface when said flap apparatus is extended,
      3. a flexible panel adjoining said rear panel and overlying a portion of said panel supporting edge of said rigid structural member, said flexible panel for forming the central portion of said flap airfoil surface when said flap apparatus is extended, and
      4. a bullnose and means pivotally mounting said bullnose on said rigid structural member, said bullnose for forming the leading portion of said flap airfoil surface when said flap apparatus is extended,
   b. actuating means coupled to said wing and to said flap means for moving said flap means between
      1. an extended position wherein said flap means extends downwardly and forwardly from said wing and
      2. a retracted position wherein said flap means is positioned in said opening in the bottom of said wing, said rigid panel in said retracted position forming a portion of the bottom surface of said wing, and
   c. linkage means mounted on said flap means and operative in response to movement of said actuating means for flexing said flexible panel between
      1. a first position when said flap means is in said extended position wherein said flexible panel rests on said flap supporting edge of said rigid structural member to conform said flexible panel to said desired curvature, and
      2. a second position when said flap means is in said retracted position wherein said flexible panel is flexed to a position spaced from said panel supporting edge of said rigid structural member so as to form a portion of the bottom surface of said wing, and
   said linkage means being further operative in response to movement of said actuating means for pivoting said bullnose between
      1. a first position when said flap means is in said extended position wherein said bullnose extends downwardly from said flexible panel to form the leading portion of said flap airfoil surface, and
      2. a second position when said flap means is in said retracted position wherein said bullnose is positioned within said opening and above said flexible panel.

7. The apparatus of claim 6 wherein said wing has a predetermined curvature on the bottom surface thereof, said rigid panel having a curvature the same as the bottom surface of said wing corresponding to the location of said rigid panel when said flap means is in said retracted position, said flexible panel when in said second position having a curvature the same as said bottom surface of said wing corresponding to the position thereof when said flap means is in said retracted position, the curvature of said flexible panel being greater when said flap means is in said extended position and when said flexible panel is resting on said flap supporting edge of said rigid arm than when said flap means is in said retracted position.

8. The apparatus of claim 6 wherein said linkage means comprises:
   a first linkage pivotally connected at a first pivot point to said bullnose and pivotally connected at a second pivot point to said flexible panel, said first pivot point being positioned so as to move toward said rigid structural member as said bullnose postion is pivoted from said first position to said second position, thereby flexing said flexible panel to said second position spaced from panel supporting edge of said rigid structural member, and
   a second linkage pivotally connected at a first pivot point to said bullnose and pivotally connected at a second pivot point to said actuating means, said second linkage being so constructed to pivot said bullnose between said first and second positions in response to movement of said actuating means.

* * * * *